US012577062B2

(12) United States Patent
Viviroli

(10) Patent No.: US 12,577,062 B2
(45) Date of Patent: Mar. 17, 2026

(54) MACHINE NETWORK AND METHOD FOR ARRANGING CABLES ACCORDING TO A SPECIFIED CABLE SEQUENCE

(71) Applicant: komax Holding AG, Dierikon (CH)

(72) Inventor: Stefan Viviroli, Horw (CH)

(73) Assignee: komax Holding AG, Dierikon (CH)

( * ) Notice: Subject to any disclaimer, the term of this patent is extended or adjusted under 35 U.S.C. 154(b) by 240 days.

(21) Appl. No.: 18/376,043

(22) Filed: Oct. 3, 2023

(65) Prior Publication Data

US 2024/0109732 A1 Apr. 4, 2024

(30) Foreign Application Priority Data

Oct. 4, 2022 (EP) ..................................... 22199560

(51) Int. Cl.
| | |
|---|---|
| *H01R 43/28* | (2006.01) |
| *B65G 17/12* | (2006.01) |
| *B65G 17/32* | (2006.01) |
| *B65G 43/10* | (2006.01) |
| *B65G 47/52* | (2006.01) |

(52) U.S. Cl.
CPC ............. *B65G 43/10* (2013.01); *B65G 17/12* (2013.01); *B65G 17/32* (2013.01); *B65G 47/52* (2013.01)

(58) Field of Classification Search
CPC ........ B65G 17/12; B65G 17/32; B65G 43/10; B65G 47/52; H01R 43/28; Y01T 29/5196; H02G 1/1248
USPC ........................................................ 29/857
See application file for complete search history.

(56) References Cited

U.S. PATENT DOCUMENTS

| | | | |
|---|---|---|---|
| 4,835,858 A | 6/1989 | Adlon et al. | |
| 5,188,213 A | 2/1993 | Koch | |
| 5,208,977 A * | 5/1993 | Ricard ................. | G02B 6/4226 |
| | | | 29/33 F |

(Continued)

FOREIGN PATENT DOCUMENTS

| | | |
|---|---|---|
| EP | 0 483 462 A1 | 5/1992 |
| EP | 0 508 695 A2 | 10/1992 |

(Continued)

OTHER PUBLICATIONS

European Search Report dated Mar. 23, 2023 in European Application No. 22199560.8, with English translation of the relevant parts.

*Primary Examiner* — Douglas A Hess
(74) *Attorney, Agent, or Firm* — Collard & Roe, P.C.

(57) ABSTRACT

A machine network for arranging cables according to a specified cable sequence includes first and second cable output devices and a cable transport device. The sequence includes cable types from at least one first and one second cable type group. The first cable type group includes only the first cable type and the second cable type group includes only the second cable type. The first cable output device is configured for outputting a first cable type group cable. The second cable output device is configured for outputting a second cable type group cable. The cable transport device is configured for selectively accepting the first cable output device cable and the second cable output device cable and for transporting the accepted cables. The selective acceptance occurs at least partially according to the specified cable sequence. A method for arranging cables according to the specified cable sequence utilizes the machine network.

16 Claims, 8 Drawing Sheets

(56)                    References Cited

U.S. PATENT DOCUMENTS

| | | | | |
|---|---|---|---|---|
| 5,355,581 | A * | 10/1994 | Soriano | H01R 43/20 |
| | | | | 29/748 |
| 5,427,327 | A * | 6/1995 | Anderson | B21C 47/32 |
| | | | | 242/362 |
| 5,774,979 | A * | 7/1998 | Kraft | H04Q 1/14 |
| | | | | 29/857 |
| 6,330,746 | B1 * | 12/2001 | Uchiyama | B60R 16/0207 |
| | | | | 29/760 |
| 9,257,808 | B1 * | 2/2016 | Guglielmo | H01B 13/01209 |
| 10,148,055 | B2 | 12/2018 | Hirata et al. | |
| 11,276,992 | B2 * | 3/2022 | Bächler | H02B 3/00 |
| 11,529,662 | B2 * | 12/2022 | Achinger | B21C 51/00 |
| 11,705,684 | B2 * | 7/2023 | Sorg | H01R 43/28 |
| | | | | 29/863 |

FOREIGN PATENT DOCUMENTS

| | | | | | |
|---|---|---|---|---|---|
| EP | 2 418 658 | A1 | 2/2012 | | |
| EP | 3716416 | B1 * | 4/2025 | ............ | H01R 43/28 |
| WO | WO-2019211490 | A1 * | 11/2019 | ............ | H01R 43/28 |
| WO | 2022/195395 | A1 | 9/2022 | | |

* cited by examiner

MACHINE NETWORK AND METHOD FOR ARRANGING CABLES ACCORDING TO A SPECIFIED CABLE SEQUENCE

CROSS REFERENCE TO RELATED APPLICATIONS

Applicant claims priority under 35 U.S.C. § 119 of European Application No. 22199560.8 filed Oct. 4, 2022, the disclosure of which is incorporated by reference.

BACKGROUND OF THE INVENTION

1. Field of the Invention

Embodiments of the present disclosure relate to a machine network for arranging cables according to a specified cable sequence. Further embodiments relate to a method for arranging cables according to a specified cable sequence utilizing a machine network.

2. Description of the Related Art

Often, different types of cables are used in a location for producing electrical connections. For example, the location is a production facility for a product, in which the different types of cables are used. An example of such a product is a motor vehicle, an example of the production facility is an assembly plant for the motor vehicle, and for example the different types of cables are installed, individually or combined into cable harnesses, in the motor vehicle in the assembly plant. A different type is defined by one or more variable parameters, which include for example the length, the sheath color and/or the terminal mounting of the cables.

In each specimen of the product, an amount of such different types of cables is needed in a certain quantity. A sequential arrangement of such different types of cables is referred to as cable sequence. When for example different (differently configured) types of cables originate from a group including a cable with a configuration A (of type A), one with a configuration B (of type B), one with a configuration C1 (of type C1), one with a configuration C2 (of type C2) and one with a configuration D (of type D), an exemplary cable sequence then includes a sequential arrangement A, B, C1, C2, D and another exemplary cable sequence includes a sequential arrangement B, B, D, B, A.

Cable processing machines for making-up (including at least a cutting to length, stripping and if applicable mounting of a terminal such as for example a crimp terminal) of cables are known, which with a machine configuration always produce cables of the same type, for example only cables of type A. When cables of another type are produced on the same cable processing machine, this cable processing machine has to be converted to another machine configuration, so that it subsequently produces for example only cables of type B. The produced cables are removed as lots from the storage tray and transported to possible further processing steps (e.g. laying on a cable board), possibly even with intermediate storage. The further processing steps include the process of separating and assembling into sequences the lots for example in that a person on the laying board removes the cables required for each cable harness from different lots. Thus, such cable processing machines are also referred to as machines of the lot production type.

Further, cable processing machines for making-up (including at least a cutting to length, stripping and if required mounting of a terminal) cables are known, which with a machine configuration can produce one or more cable sequences. Such machines of complex structure comprise all processing devices needed for a cable sequence. In order to produce the cable sequence, all required starting materials are brought to the machine, which then directly produces in sequences, or even assembles the materials into cable harnesses.

Compared with the sequence production, the lot production has the disadvantage that it requires a downstream process step (separating the wires and rearrangement into sequences), which is an elaborate step that is difficult to automate.

The sequence production on a cable processing machine compared with the lot production has the disadvantage that all devices necessary for the production of the sequence are installed on the machine but only a part thereof is active at all times. In addition, the machine has to be a technically more elaborate and larger construction. Both worsen the cost/benefit ratio. Accordingly, four crimping modules are required for example on the said machine for a sequence with four different crimp terminals, of which however per cable only one each is active per cable end while in the case of machines producing lots, all modules are permanently active on two machines each with two crimping modules.

The publication U.S. Pat. No. 10,148,055 B2 discloses a cable harness production system with a cable processing machine of the sequence production type.

The publication EP 0 508 695 A2 describes an elaborately embodied cable processing machine which, standing alone, can produce a cable sequence. This cable processing machine has a complex configuration. According to this conventional technique, the cables are provided with identification markings at regular intervals. A transport device serves for the simultaneous and step-wise transporting of the cable thus prepared.

The publication EP 2 418 658 A1 describes a further elaborately embodied cable processing machine which, standing alone, can produce a cable sequence. This cable processing machine also has a complex configuration. According to this conventional technique, different types of cables are held in an arrangement pattern.

The publication U.S. Pat. No. 4,835,858 A describes a device for assembling a cable harness from sub-groups of cable harnesses. A control device serves for selecting different transport devices for assembling a cable harness from a sequential arrangement of more than two different sub-groups. The cables of the sub-groups are jointly mounted in a connector housing in advance.

There is a need for a solution for the automated production of a cable sequence, with which the cost/benefit ratio is improved.

SUMMARY OF THE INVENTION

According to an aspect of the present disclosure a machine network is provided. The machine network serves for arranging cables according to a specified cable sequence. The cable sequence includes cable types from at least one first cable type group and a second cable type group. With a specified first cable type and a specified second cable type distinct therefrom, the first cable type group includes only the first cable type (but not the second cable type), and the second cable type group includes only the second cable type (but not the first cable type).

Any of first cable type group and second cable type group however can additionally include further cable types; for example, the first cable type group can additionally include a third cable type, and the second cable type group can additionally include a fourth cable type; or at least one of the first cable type group and of the second cable type group can include even more further cable types, which are distinct from the first, and also from the second cable type.

A cable, as used herein, includes for example an individual wire cut to a certain length with or without processing and mounting of the ends, a twisted pair or another product produced on a popular cable processing machine.

The machine network includes a first cable output device and a second cable output device. The first cable output device is configured for outputting a cable (or multiple cables) of the first cable type group. The second cable output device is configured for outputting a cable (or multiple cables) of the second cable type group. Thus, the second cable type is not present among the cables output by the first cable output device and the first cable type is not present among the cables output by the second cable output device. For example, the first cable output device cannot output cables of the second cable type, and the second cable output device cannot output cables of the first cable type. In a case, in which the respective cable output device is for example a cable processing machine, the first cable output device (first cable processing machine) according to this example cannot produce cables of the second cable type and the second cable output device (second cable processing machine) cannot produce cables of the first cable type.

A machine network, as used herein, is configured so that the different cable output devices (for example the first cable output device and the second cable output device) interact in order to finally achieve the arrangement according to the desired cable sequence, but none of the individual cable output devices alone is configured and/or suitable for achieving the arrangement according to the desired cable sequence. In other words: in the machine network according to the present disclosure, at least the first cable output device and the second cable output device have to interact, i.e. form a network, in order to achieve the desired cable sequence.

The machine network, further, includes a cable transport device. The cable transport device is configured for selectively accepting the cable from the first cable output device and of the cable from the second cable output device, and for transporting the accepted cables. The selective accepting takes place at least in part according to the specified cable sequence.

The cable sequence is not restricted to cable types from the first and second cable type group. Accordingly, the configuration is not restricted to exactly two cable output devices either, but more than two cable output devices can also be provided.

Selective accepting at least in part according to the specified cable sequence, as used herein, includes in particular an accepting of the different cable types in such a manner that as a result of the acceptance at least one or more portions of the cable sequence materialize or turn up at the cable transport device. For example, the cable transport device includes multiple receiving devices such as for example holders disposed in sequential arrangement (e.g. sequentially) and on the receiving devices disposed in sequential arrangement, the different types of cables turn up as a consequence of the selective acceptance at least according to a portion of the specified cable sequence. Such a portion includes for example more than two cables in the sequential arrangement according to the specified cable sequence.

It is conceivable, in particular, that gaps initially remain between the individual portions, so that the cable sequence does not yet materialize completely and a subsequent joining of further cables in the gaps takes place in such a manner that the cable sequence materializes completely. Alternatively or additionally it is conceivable that initially only individual portions are arranged according to the cable sequence and other portions are not initially arranged according to the cable sequence, and subsequently a re-sorting of the portions not conforming to the cable sequence takes place in such a manner that the cable sequence materializes completely.

Selective accepting, as used herein, includes for example also an accepting or removing of the matching individual cables of a respective cable type from the lots, which the respective cable output devices output (for example, when the cable output devices are cable processing machines and/or comprise such, an accepting of the individual cables from the lots produced by the respective cable processing machines), so that a subsequent assembly according to the desired cable sequence can take place.

In embodiments, the cable transport device is configured in such a manner that the selective acceptance takes place completely according to the specified cable sequence. This includes that the different cable types are accepted in such a manner that as a result of the acceptance, the complete cable sequence materializes or turns up.

The selective acceptance includes a direct acceptance from the first and/or second cable output device. Alternatively or additionally, the selective acceptance includes an indirect acceptance, i.e. it is conceivable that the first and/or second cable output device initially pass on the respective cables to one or more intermediate stations and the cable transport device then selectively accepts the respective cables from the intermediate station or stations, but thereby indirectly from the first and/or second cable output device.

In embodiments, the cable transport device includes a plurality of (consecutive) holders arranged one behind the other in a sequence direction. Each holder serves for receiving at least one part of a cable. In particular, each holder serves for receiving at least one part of a cable according to the cable sequence. Arranged one after the other in the sequence direction, as used herein, includes an arrangement of the holders relative to one another at a constant or variable interval, for example linearly next to one another or annularly next to one another or loop-like next to one another. In particular, the sequence direction is a transport direction of the cable transport device in which the cables are transported in the sequence defined by their sequential arrangement.

It is conceivable that multiple holders following one another receive different parts of one and the same cable. For example, one and the same cable can be placed or suspended as loop onto or from the multiple consecutive holders, e.g. the one end of the cable on one holder and the other end of the cable on the following holder. This includes that different parts of one and the same cable are received by consecutive holders leaving out individual holders.

In embodiments, the machine network further includes a cable removal device. The cable transport device, further, is configured for the selective transfer of a cable from the cable transport device to the cable removal device. The selective transfer takes place at least partially according to the specified cable sequence. This includes in particular that when accepting the cable from the first cable output device and the cable from the second cable output device, initially only one or more portions are arranged according to the specified cable sequence; then, it can be brought about by targeted (selective) transfer of the matching cable from the cable transport device to the cable removal device that the specified cable sequence materializes in at least one further portion. This procedure can also be repeated until, through the targeted transfer of the matching cable from the cable transport device to the cable removal device, the specified cable sequence materializes completely. The selective transfer of the cable from the cable transport device to the cable removal device however can also constitute an intermediate step, which is followed by one or more further operations of selective acceptance of a cable from the first cable output device and/or of a cable from the second cable output device.

In embodiments, the machine network, further, includes a gripper device for the selective acceptance and/or for the selective transfer of the cable. The gripper device can be arranged in particular or brought into such a position that it can navigate to or approach the position of a holder of the cable transport device for accepting/transferring a cable and that, for accepting/transferring, it can navigate to or approach the position of at least one of the first cable output device, of the second cable output device and of the cable removal device. Bringing to the position can include a moving of the gripper device in the position and/or include a moving of at least one of the cable transport device, the first cable output device, the second cable output device and the cable removal device relative to a fixed position of the gripper device. In exemplary embodiments, the gripper device includes a robot arm and a gripper.

In embodiments, the cable transport device is moveable, in particular automatically moveable to at least one of the first cable output device, the second cable output device and the cable removal device. For example, the cable transport device is arranged on motor-controllable rollers and can be selectively and automatically moved through suitable control of the rollers so that, depending on current necessity for obtaining the specified cable sequence, it approaches the first cable output device, the second cable output device and the cable removal device.

In embodiments, at least one of the first cable output device and of the second cable output device includes a cable processing machine.

In embodiments, at least one of the first cable output device, of the second cable output device and of the cable removal device includes a cable feeding device.

In embodiments, the cable feeding device is configured for accepting a cable manually fed in by an operating person. Alternatively or additionally the cable feeding device is configured for transferring a cable to an operating person. Accordingly, by means of the cable feeding device, cables, which are included in the first cable type group and/or the second cable type group, can be manually fed into the machine network and its automatic process or removed therefrom.

In embodiments, at least one of the first cable output device, the second cable output device and the cable removal device includes a cable store. A cable store is configured for example so that it receives from and at a later time, again outputs one or more cables from/to the cable transport device, e.g. for re-sorting the cables or for buffer storing of prefabricated cables.

It is likewise conceivable that additionally to the (primary) cable transport device one or more further (secondary) cable transport device/s is/are present. Such further cable transport devices can themselves serve for example as cable stores or be considered as such.

In embodiments, the machine network, further, includes a control which is configured for controlling at least one of the selective acceptance and the selective transfer. In embodiments, the control is configured, further, so that it accepts a desired cable sequence (e.g. via an input unit), determines a composition from at least the first cable type group and from the second cable type group, namely according to the desired cable sequence, and thus determines the specified cable sequence and produces an actual sequential arrangement of cables according to the specified cable sequence by controlling at least the first cable output device and the second cable output device and optionally the cable removal device.

In embodiments, the control is further configured for storing data which contain at least one from the following group: current position of a cable in the cable transport device, source of a cable in the cable transport device, configuration of the machine network, measurement data of a cable in the cable transport device, production data of a cable in the cable transport device.

According to a further aspect of the present disclosure a method for arranging cables according to a specified cable sequence is provided. The cable sequence includes cable types from at least one first cable type group and a second cable type group. Of a first cable type and a second table type, the first cable type group includes only the first cable type, and of the first cable type and the second cable type the second cable type group includes only the second cable type. The method includes a forming of a machine network; and an automatic controlling of the machine network. The machine network includes a first cable output device, configured for outputting a cable of the first cable type group; a second cable output device, configured for outputting a cable of the second cable type group; and a cable transport device, configured for the selective acceptance of the cable from the first cable output device and of the cable from the second cable output device and for transporting the accepted cables. The controlling of the machine network includes such a control that the selective acceptance, at least partially, takes place according to the specified cable sequence.

In embodiments of the method, the machine network, further, includes a cable removal device, wherein the cable transport device is further configured for selectively transferring a cable from the cable transport device to the cable receiving device, and wherein the method further includes an automatic controlling of the machine network in such a manner that the selective transfer takes place at least partially according to the specified cable sequence.

In embodiments of the method, the same, further, includes a receiving of a desired cable sequence; a determining of a composition of at least the first cable type group from the first cable output device and of the second cable type group from the second cable output device according to the desired cable sequence as the specified cable sequence; and a producing of an actual sequential arrangement of cables according to the specified cable sequence by controlling at least the first cable output device and the second cable output device.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

In the following, exemplary embodiments are described which can be suitably combined with one another or from which individual features and/or elements can be omitted when appropriate.

Figure 1:
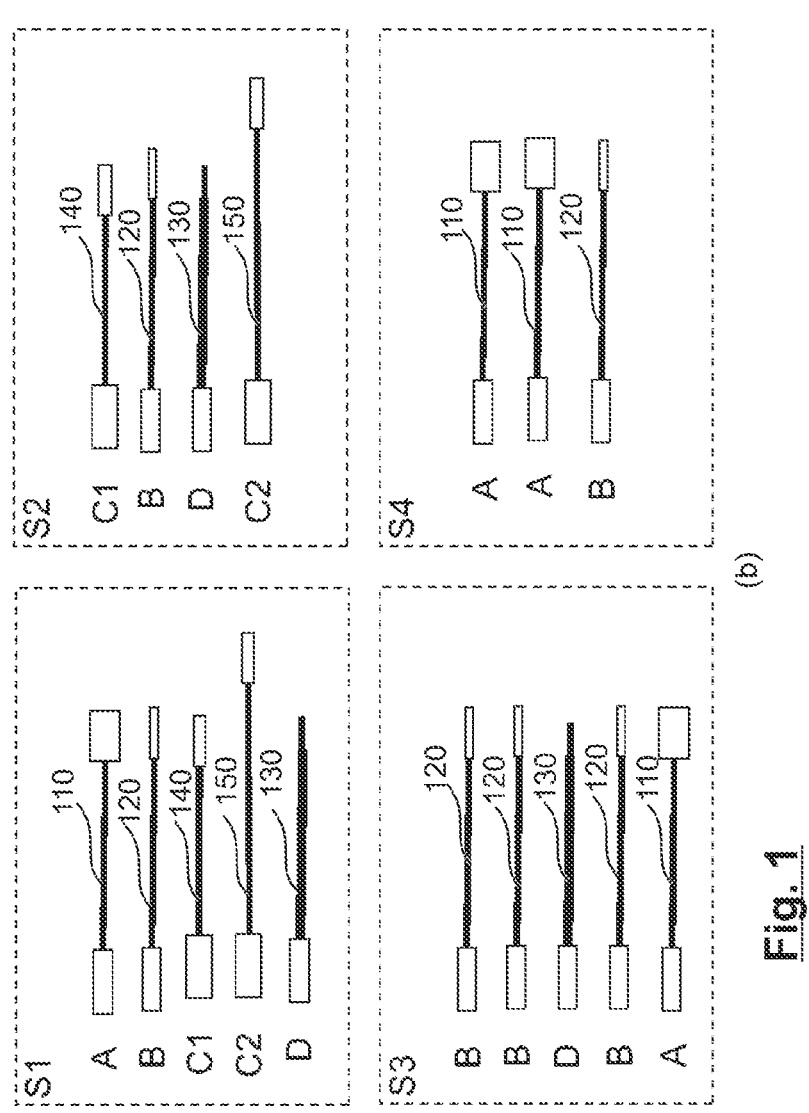
FIG. 1 shows a schematic view of cable sequences.
Figure 1:
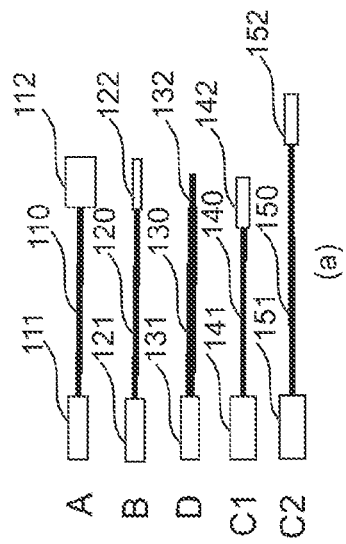

FIG. 1 shows a schematic view of cable sequences S1, S2, S3, S4.

In FIG. 1(a) the following is shown: a cable 110 of a first cable type comprises a first connection end configuration 111 and a second connection end configuration 112, which in the following is referred to as cable type A; a cable 120 of a second cable type comprises a first connection end configuration 121 and a second connection end configuration 122, which in the following is referred to as cable type B; a cable 130 of a third cable type comprises a first connection end configuration 131 and a second connection end configuration 132, which in the following is referred to as cable type D; a cable 140 of a fourth cable type comprises a first connection end configuration 141 and a second connection end configuration 142, which in the following is referred to as cable type C1; and a cable 150 of a first cable type comprises a first connection end configuration 151 and a second connection end configuration 152, which in the following is referred to as cable type C2. The cable types A, B, D, C1, C2 each differ in at least one condition of the cable itself (e.g. cable length, conductor configuration, conductor cross-section, conductor material, insulating material, colour of the insulation, etc.) and of the first and/or second connection end configuration (presence or absence of a terminal, terminal type, etc.).

In a product to be assembled, for example a motor vehicle, a quantity of the different cable types A, B, D, C1, C2 is required; this quantity is referred to as cable sequence (of the production order). In FIG. 1(b) the following is shown: a cable sequence S1 includes, in this order, cables of the cable types A, B, C1, C2, D. A cable sequence S2 includes, in this order, cables of the cable types C1, B, D, C2. A cable sequence S3 includes, in this order, cables of the cable types B, B, D, B, A. A cable sequence is S4 includes, in this order, cables of the cable types A, A, B.

Generally, the bases are the following considerations: the cable sequence of the production order, in particular the entire cable sequence of the production order, is divided into sub-quantities which can be produced efficiently. An efficient production of one or more cable types in each case is achieved for example by a specialized or specially configured cable processing machine, so that a sub-quantity is formed for example by the quantity of all cables of the same cable materials with the same terminals but different cable length. Multiple cable processing machines and further devices are combined into a machine network for the joint production of the cable sequence S1, S2, S3, S4. The sub-quantities are formed and distributed as production orders to the parts of the machine network and coordinated so that each part (e.g. each cable processing machine) is matched preferably efficiently, in particular without or only with few unutilized process modules, only with few conversion operations and the like to the respective production order.

Figure 2:
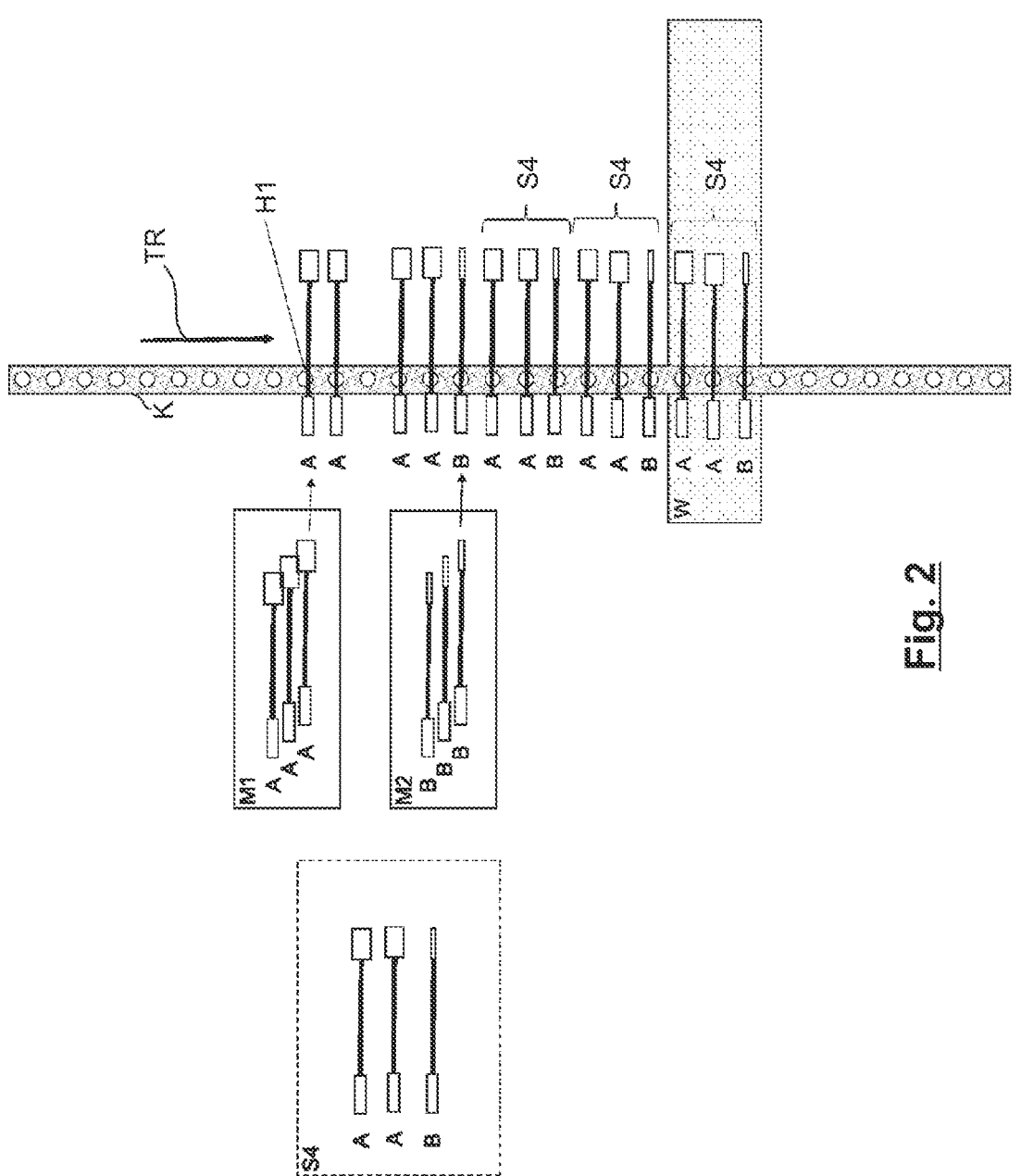
FIG. 2 shows schematically a linear cable transport device with cables of multiple different cable types.

Exemplarily, FIG. 2 shows schematically a cable transport device K with holders for cables arranged linearly in sequential arrangement, wherein here only a holder H1 is denoted. For explanation purposes, it is assumed in FIG. 2 that a first cable type group includes exactly the cable type A and a second cable type group includes exactly the cable type B. It is also conceivable that the first and/or the second cable type group additionally include other cable types, but that the first cable type group and the second cable type group differ in at least one cable type.

The cable transport device K shown in FIG. 2 transports the held cables in a transport direction TR. In the example in FIG. 2, the holders according to the sequential arrangement of their arrangement are to hold the cables according to the cable sequence S4. For this purpose, a first cable output device, in FIG. 2 in the form of a first cable processing machine M1, outputs cables of the first cable type group (here: only cables of cable type A), and a second cable output device, in FIG. 2, again in the form of a second cable processing machine M2, outputs cables of the second cable type group (here: only cables of cable type B). The cable transport device K accepts the cables of cable type A and the cables of cable type B from the respective machine M1, M2 in such a manner that the cable sequence S4 (i.e. A, A, B) materializes in the sequential arrangement on the cable transport device K. The sequence A, A, B (sequence S4) according to the example from FIG. 2 is thus distributed over the two cable processing machines (M1, M2) so that the machine M1 produces all cables of cable type A and the machine M2 all cables of cable type B.

Each cable output device such as for example the cable processing machine M1, M2 is advantageously constructed so that it provides (for example produces or removes from a cable store) and subsequently holds at least at one point a cable, so that the cable transport device K can efficiently accept the said cable at this point. For accepting, a pivot arm of a pivot machine (not shown), which holds the trailing cable end of the produced cable, can move the cable to a defined location, where it is accepted by the cable transport device K, for example a holder of the cable transport device K, which at this time is situated at the defined location.

Figure 3:
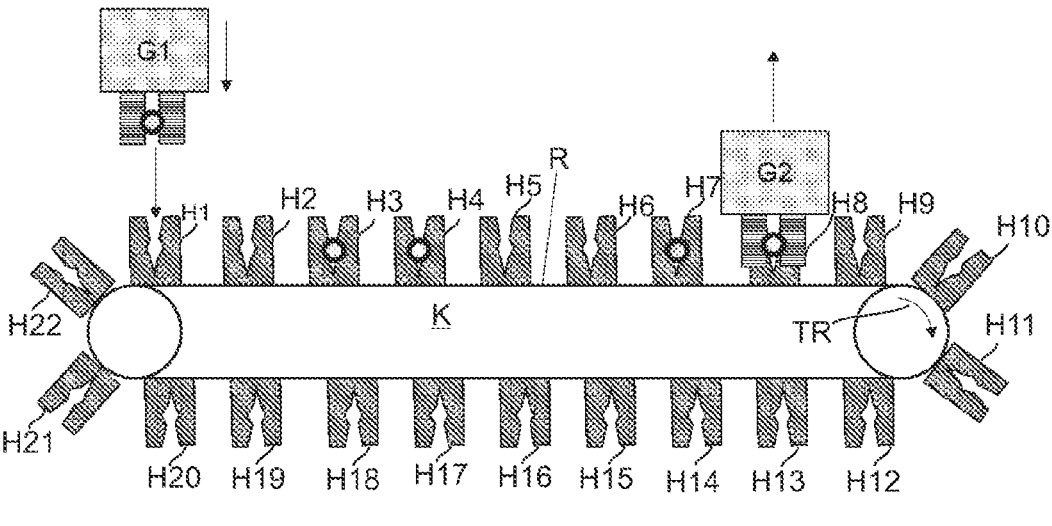
FIG. 3 shows schematically a circulating cable transport device with holders as well as grippers for loading the holders.

FIG. 3 shows schematically a plan view of a circulating cable transport device K with holders H1 to H22, as well as grippers (cable grippers) G1, G2 for loading the holders. The circulating cable transport device moves the holders H1 . . . H22 in a transport direction TR. The transport direction TR is exemplarily shown in clockwise direction in FIG. 3. However, it is also possible that the transport direction runs counter the clockwise direction or that the transport direction changes. In FIG. 3, the number of holders is exemplarily shown with 22; however, any number of holders is also possible, as long as the longest desired cable sequence can be received by the holders, i.e. also fewer or more than 22 holders.

The cable transport device K is designed for receiving the cables in the holders H1 . . . H22. For example, a roller chain or a circulating belt R is equipped with the holders H1 . . . H22 (cable holders). Into each holder H1 . . . H22, at least a part of a cable can be introduced so that the respective holder holds, for example clamps, the introduced part of the cable. The holders H1 . . . H22 are preferentially arranged at an even interval (at a constant interval from one another); however, it is also conceivable that the holders H1 . . . H22 have different intervals from one another. The holders H1 . . . H22 are preferentially formed similarly or of the same type; however, it is also conceivable to provide different types of holders H1 . . . H22. For example, different types of holders H1 . . . H22 can be optimized for holding different cable types.

The cable transport device K is placed on the cable output device (for example the cable processing machine M1, M2) so that the cable can be accepted into the cable transport device with a suitable acceptance device or by means of a relative movement of the cable output device.

When, for example the holder (cable holder) H1, into which a cable is to be accepted at an acceptance time is situated at the defined place (a transfer place), the cable from the cable output device (e.g. the cable processing machine M1) is accepted into the cable gripper G1 and subsequently the cable from the cable gripper G1 is accepted into the holder H1. The remaining holders H2 . . . H22 are for example empty or loaded with other cables at the acceptance time. The further cable gripper G2 serves for example for accepting a cable from the cable transport device K and bring the same to another location.

Figure 4:
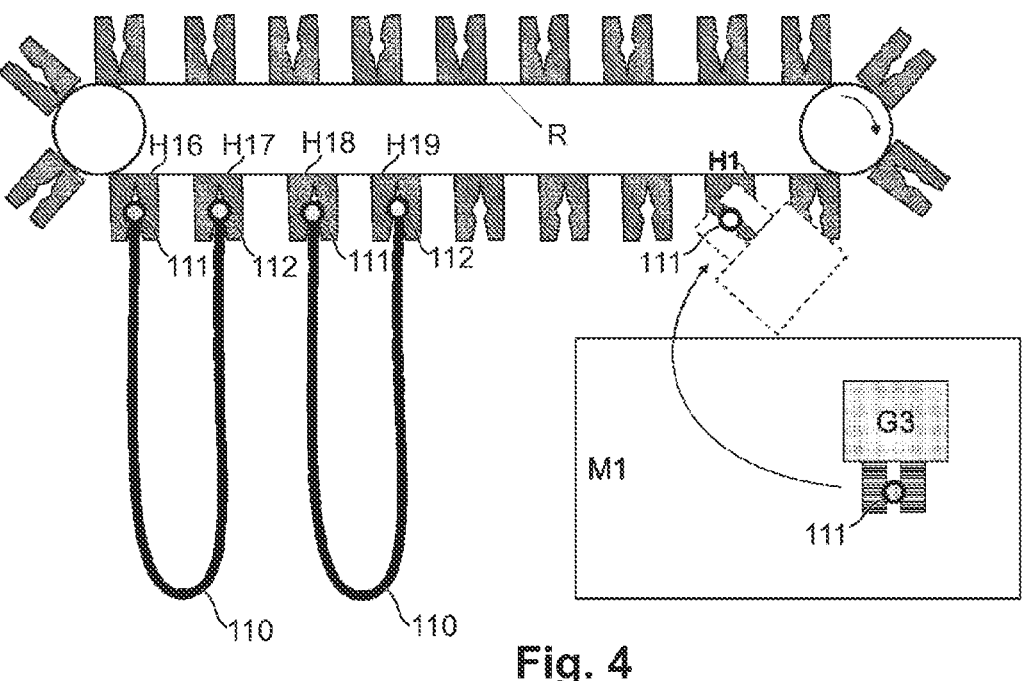
FIG. 4 shows schematically the circulating cable transport device with partially loaded holders.

FIG. 4 shows schematically the circulating cable transport device K from FIG. 3 with partially loaded holders. In FIG. 4 it is shown that the holders H1 . . . H22 of the cable transport device K are arranged above the cable plane, which is defined by the cable output device (here: cable processing machine M1). The acceptance device (here: a gripper G3) accepts a cable from the cable output device M1, transports it to the cable transport device K and clamps it into the matching holder (here: holder H1) of the cable transport device K. As is shown in FIG. 4, the holders H16, H17 and the holders H18, H19 are each loaded with opposite ends 111, 112 of the same cable 110; the two shown cables are thus held, suspended from the loop bend. However, this serves only for the exemplary representation of a possibility for holding the cables.

Further types for holding the cables are possible, as are shown for example, but not conclusively, in FIGS. 5 to 8.

Figure 5:
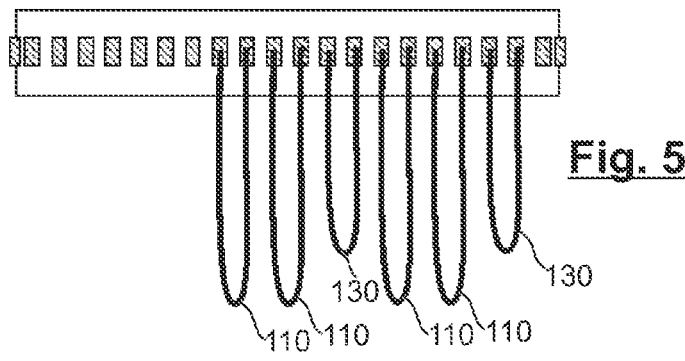
FIG. 5 shows schematically a portion of a cable transport device with partially loaded holders.
Figure 6:
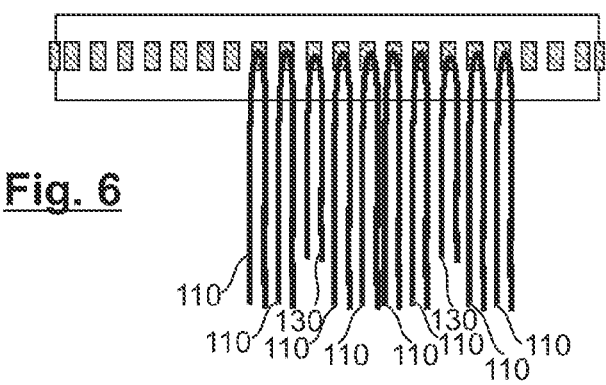
FIG. 6 shows schematically a portion of a cable transport device with partially loaded holders.
Figure 7:
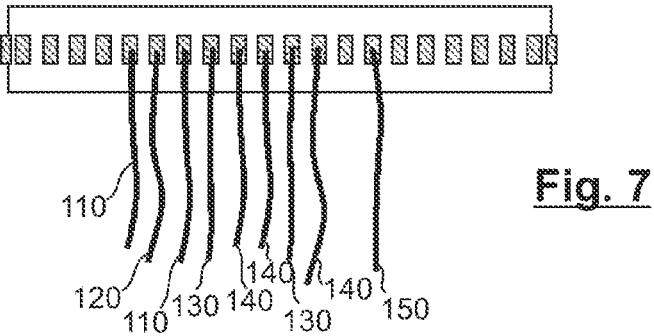
FIG. 7 shows schematically a portion of a cable transport device with partially loaded holders.
Figure 8:
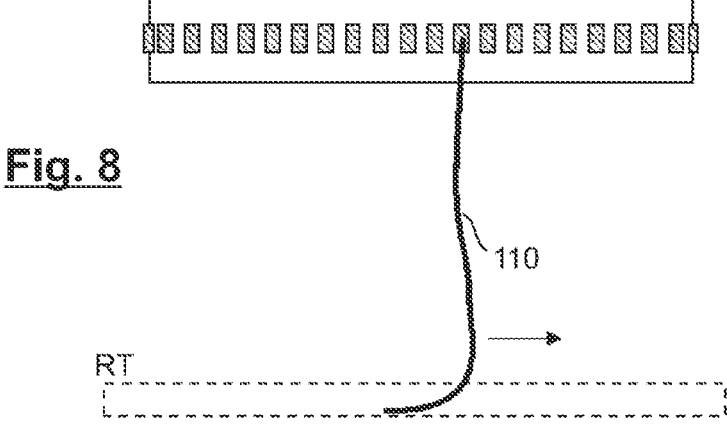
FIG. 8 shows schematically a portion of a cable transport device with partially loaded holders.

FIG. 5 shows a suspension from the loop bend; FIG. 6 shows a suspension from points distant from the cable end, for example approximately in the cable center; FIGS. 7 and 8 each show a suspension from an end of the cable each, wherein in FIG. 8 it is shown that from a certain cable length, for avoiding that the cable touches the ground, a channel RI (for example of stainless steel) is installed below the cable transport device K, for example near the ground or on the ground, so that the suspended cable is protected from damage and dirt.

Figure 9:
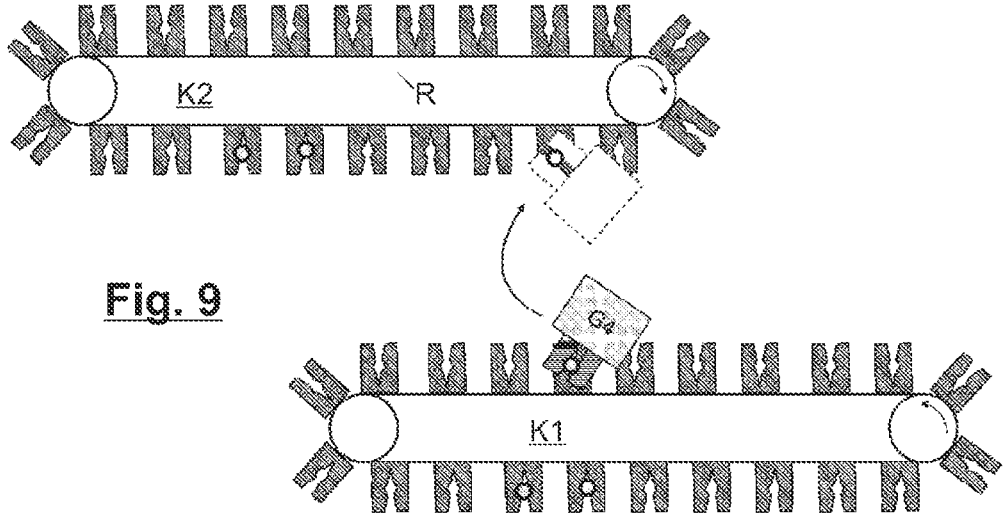
FIG. 9 shows the circulating cable transport device with holders from FIG. 3 and a further circulating cable transport device, as well as grippers for loading the holders.
Figure 10:
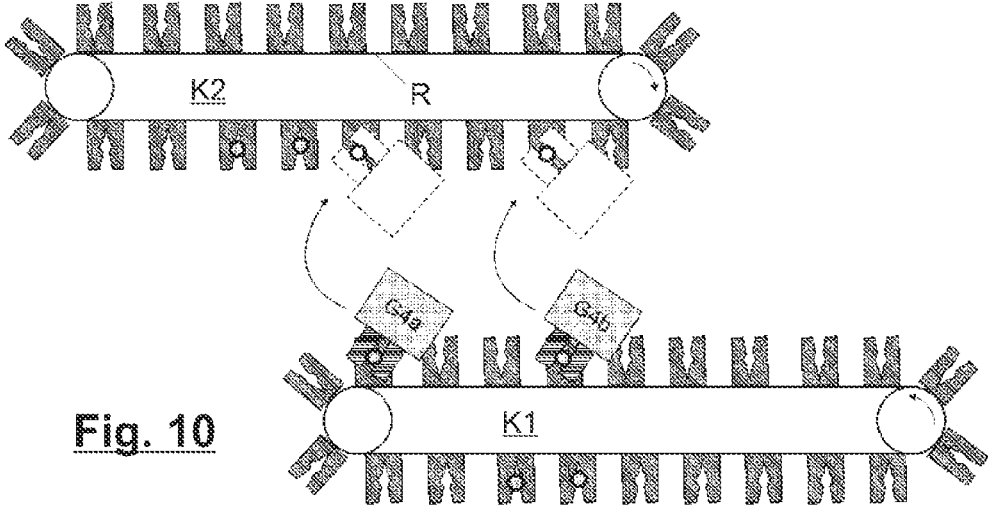
FIG. 10 shows the circulating cable transport device with holders from FIG. 3 and a further circulating cable transport device as well as grippers for loading the holders.

FIG. 9 shows the circulating cable transport device K1 with holders from FIG. 3 and a further circulating cable transport device K2 as well as a gripper G4 for loading the holders. FIG. 10 shows a variant of the cable transport devices K1 and K2 from FIG. 9 with a plurality of grippers G4a, G4b. The gripper G4 or the grippers G4a, G4b can be configured so that by means of a pivot movement it transfers a cable from the cable transport device K1 to the cable transport device K2, or vice versa. The respective belts R of the cable transport devices K1, K2 are moved for the acceptance so that the desired holders are situated at the transfer device (gripper G4, G4a, G4b). The variant from FIG. 10 can increase the throughput through the multiple grippers G4a, G4b, which can operate in parallel.

Figure 11:
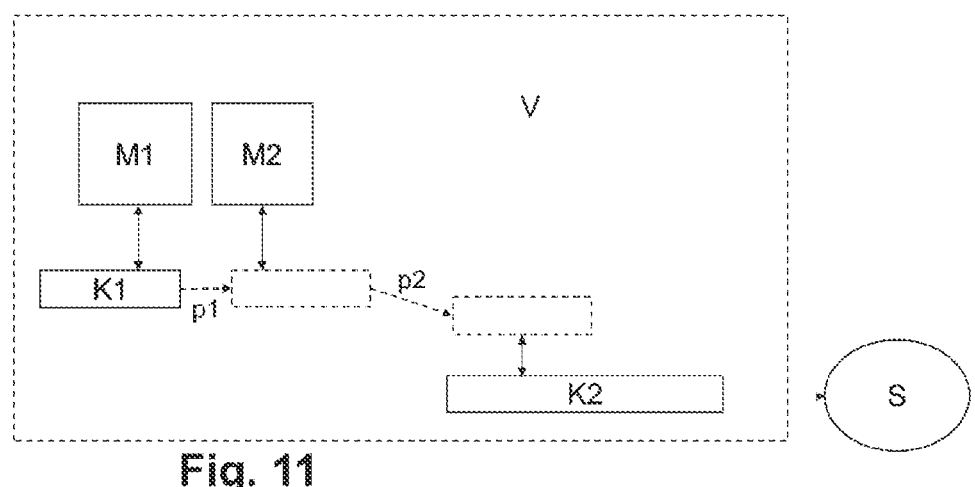
FIG. 11 shows a schematic block diagram of a machine network according to an exemplary embodiment, among other things with a moveable cable transport device.

FIG. 11 shows a schematic block diagram of a machine network V according to an exemplary embodiment. In the machine network V, a first cable processing machine M1 as first cable output device, a second cable processing machine M2 as second cable output device, a first cable transport device K1 and a second cable transport device K2 are included in the example from FIG. 11. The first cable transport device K1 accepts for example one or more cables of the first cable type at the first cable processing machine K1. The first cable transport device K1 moves on a path p1 to the second cable processing machine M2. The first cable transport device K1 accepts one or more cables of the second cable type at the second cable processing machine M2. The first cable transport device K1 moves on a path p2 to the second cable transport device K2. The second cable transport device K2 accepts the cables from the first cable transport device K1 selectively in such a manner that subsequently the specified cable sequence (here only denoted with "S") is present at the second cable transport device K2. Thus, the first cable transport device K1 in this example in FIG. 1 serves as an intermediate station from which the second cable transport device K2 indirectly accepts the cables from the first and second cable output device M1, M2.

Figure 12:
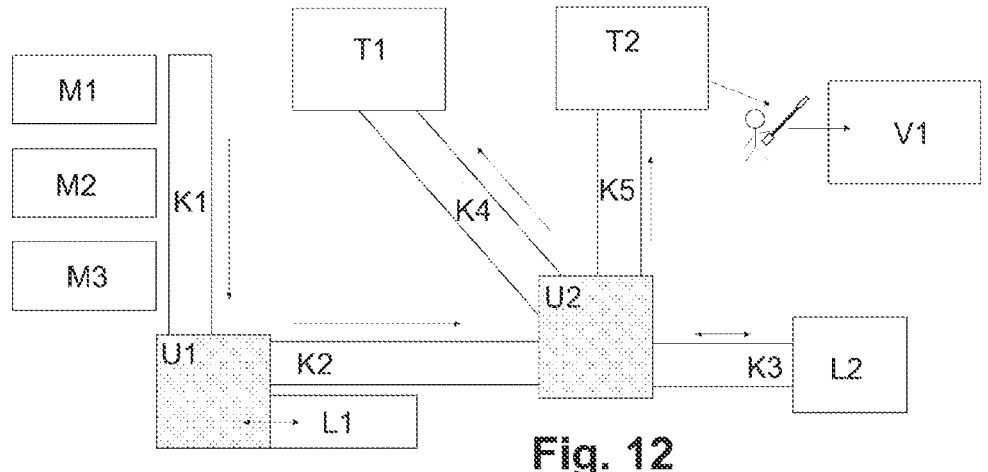
FIG. 12 shows a schematic block diagram of a machine network according to an exemplary embodiment, among other things with a cable store.

FIG. 12 shows a schematic block diagram of a machine network V according to an exemplary embodiment. The machine network V in the example from FIG. 12, includes a first cable processing machine M1 as first cable output device, a second cable processing machine M2 as second cable output device, a third cable processing machine M3 as third cable output device, a first cable store L1, a second cable store L2, a first transfer device U1, a second transfer device U2, a first cable transport device K1, a second cable transport device K2, a third cable transport device K3, a fourth cable transport device K4, a fifth cable transport device K5, an assembly machine T1, a presentation location T2 and a laying board V1.

The first cable store L1 is configured so that, by means of the first acceptance device U1, it accepts a cable from the first cable transport device K1 and, at a later time, again releases the said cable in a certain position to the first cable transport device K1 or to the second cable transport device K2. Thus, the cables can be re-sorted in the cable transport device or cables, for which at the given time no cable processing machine is available, can be prefabricated, buffer-stored and at the appropriate time can be again fed into a cable transport system. A further cable transport device or a differently configured device can serve for example as first cable store L1. A configuration as further cable transport device is advantageous such that the cables can be picked up and released in any order in that the circulating belt in each case is brought into the correct position to the respective gripper.

Figure 13:
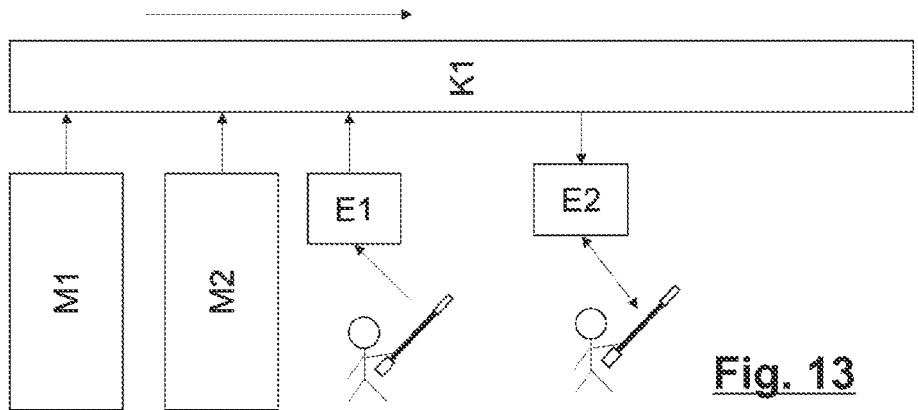
FIG. 13 shows a schematic block diagram of a machine network according to an exemplary embodiment, among other things with a cable removal device.

FIG. 13 shows a schematic block diagram of a machine network according to an exemplary embodiment. In the machine network, a first cable processing machine M1 as first cable output device, a second cable processing machine M2 as second cable output device, a first cable removal device E1, a second cable removal device E2 and a cable transport device K1 are included in the example from FIG. 13. At least one of the first cable removal device E1 and the second cable removal device E2 can have a cable selectively transferred from the cable transport device K1, namely according to the specified cable sequence S1 . . . S4. When the direction is restricted to this, as is shown in FIG. 13 with the arrow at the cable removal device E1, this is referred to as unidirectionally configured. Alternatively or additionally, the cable removal device (see the double arrow in FIG. 13 at E2) however can also be configured so that it can output a respective cable to the cable transport device K1, thus acts as cable output device. When both directions are possible, such a cable removal device E2 is referred to as bidirectionally configured.

The cable removal device E1, E2 serves for example for feeding cables from sources outside of the machine network V, for example cables which were manually produced and/or produced in another location and/or produced on a specialized cable processing machine not integrated in the machine network. The cable removal devices E1, E2 are configured so that the cables can be for example manually transferred into these, and these cables are then passed on within the machine network. Apart from this, the cable removal device E2 is configured so that cables can be removed from the cable transport system or cable store, for example for the purpose of buffer storing or quality checking of a random sample.

Figure 14:
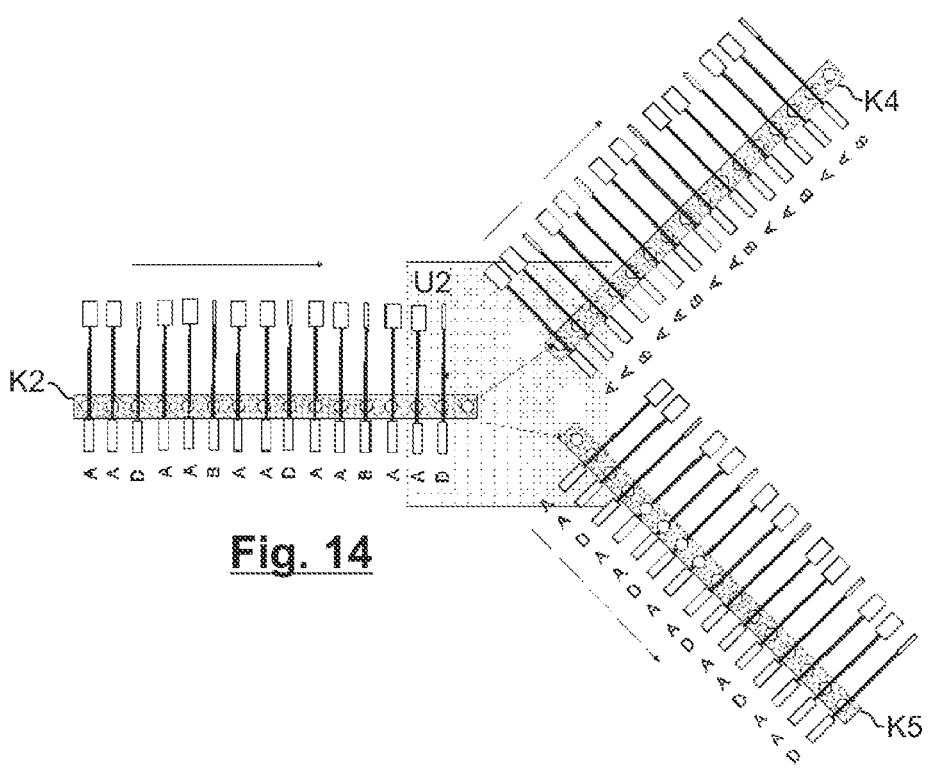
FIG. 14 shows schematically parts of a machine network for representing a distribution operation of the cables.

FIG. 14 shows schematically parts of a machine network V for representation of a distribution operation U2 of the cables. For example, a machine network is formed for example for the operations which are shown in FIG. 14, of multiple machines (M1 . . . M3), cable transport systems (K . . . K5) and cable stores (L1, L2), within which the cables are distributed by means of the distribution operation U2.

Figure 15:
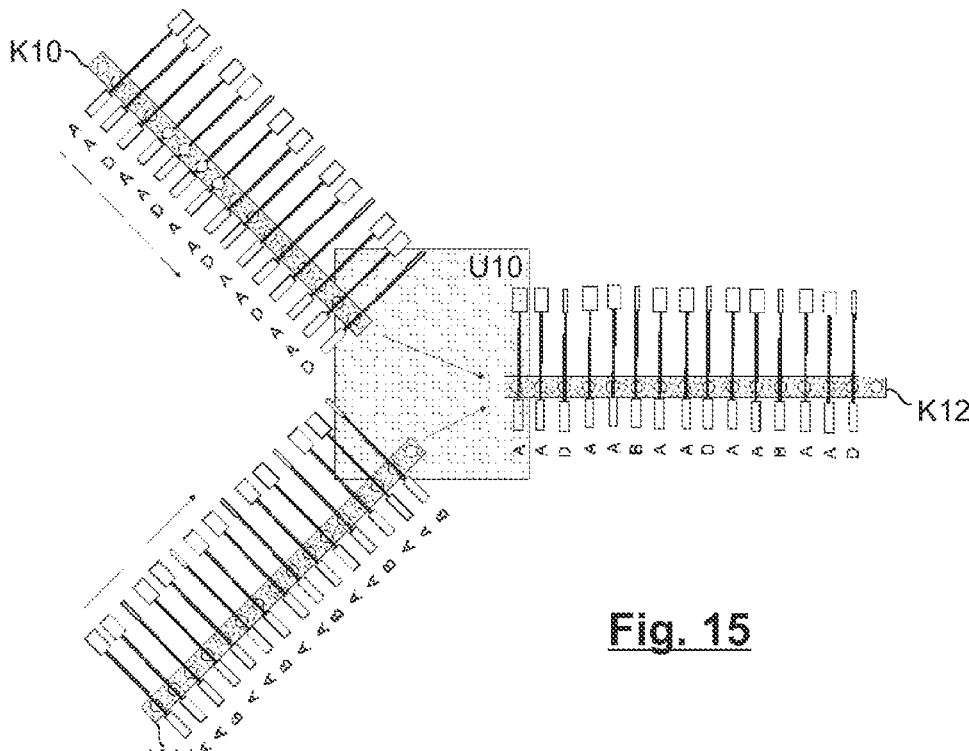
FIG. 15 shows schematically parts of a machine network for representing a combination operation of the cables.

FIG. 15 shows schematically parts of a machine network V for representing a re-sorting operation U10 of the cables. For example, a machine network is formed for the operations shown in FIG. 15 from multiple machines (M1 . . . M3), cable transport systems (K1 . . . K5) and cable stores (L1, L2), within which the cables are combined by means of the combination operation U10. Further possible operations in the machine network are among other things an exchanging and a re-sorting. At the end of one or more of these operations the specified cable sequence S1 . . . S4 is to be present.

The cables present in the specified cable sequence S1 . . . S4 are transferred by the cable transport device K for example to further processing machines, e.g. to assembly machines T1 (see FIG. 12), or they are presented to an operating person (see FIG. 12: presentation location T2), which removes the cables in the order of the sequence S1 . . . S4, in order to lay them on a laying board V1 (see FIG. 12).

Figure 16:
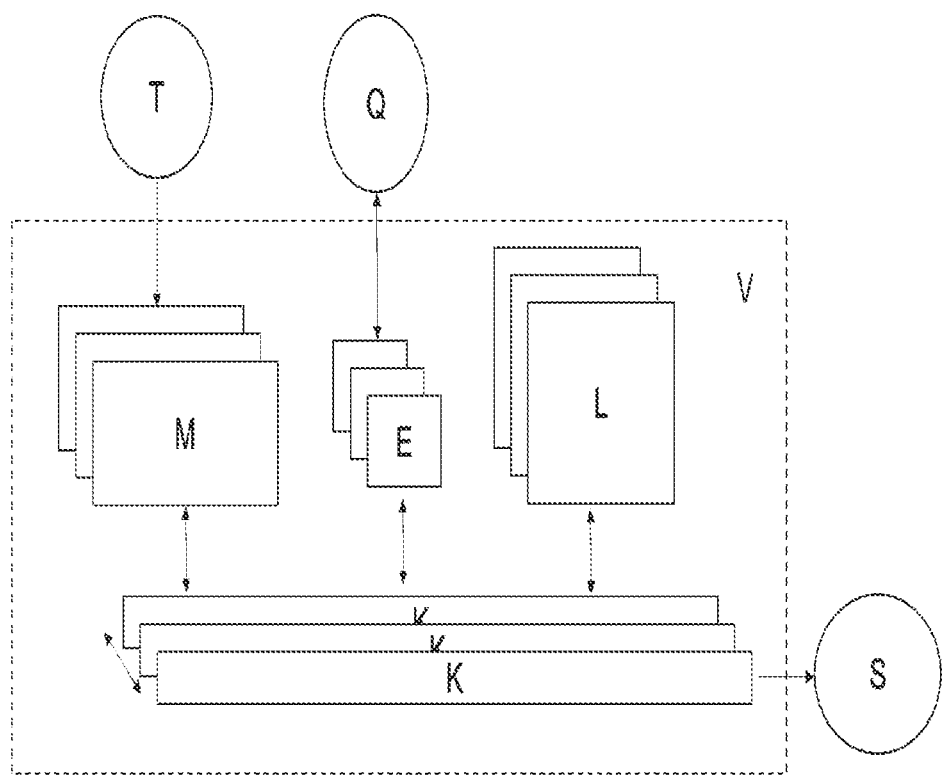
FIG. 16 shows a schematic block diagram of a machine network according to an exemplary embodiment, among other things with a control.

FIG. 16 shows a schematic block diagram of a machine network V according to an exemplary embodiment. The machine network V includes a quantity of cable output devices M (for example cable processing machines), a quantity of cable removal devices E, a quantity of cable stores L, a quantity of cable transport devices K, and a control 100. The cable processing machines M are fed parts T from the outside. The cable removal devices E can communicate with sources to the outside, i.e. accept processed cables from the sources Q and/or output process cables into the sources Q. From one of the cable transport devices K, the cables are output according to the specified cable sequence S.

The control 100 is superior for example to the machine network V. The control 100 accepts production orders for at least one sequence of different types of cables (different cable material, different end mountings, different processing steps). The control determines or calculates an advantageous division of the production orders into sub-orders and passes these production orders on as data to the cable output devices concerned (for example cable processing machines M) of the network V or controls the cable output devices (the cable processing machines M) itself.

The control 100 manages the cables output by the individual cable output devices and coordinates their transport, buffer storage and their transfer to the cable transport device(s) K in a manner that as a result the cable sequence (the specified cable sequence) S requested in the production order is available at the cable transport device K.

The control 100 coordinates for example the transfer of the cables from the cable output devices to practical positions in the cable transport device, so that the cables are arranged in a desired state on the cable transport device.

The control 100 can give recommendations or instructions to an operating person of the machine network V as to how the machine network V can be equipped optimized for certain production orders (e.g. tools, machine options, material to be processed). From this, the control 100 can automatically generate order and conversion instructions for the operating person and thus support the optimization of the machine network to the requirements.

The control 100 and/or if applicable further individual controls of parts of the machine network V can be distributed as desired over one or more parts of control hardware, computer, software and the like.

The control 100 is also configured for example so that it continuously records and stores which cables from which source are present in which position in the cable transport device, and it keeps a digital image of the loading state of the machine network V. Thus, the traceability of each individual cable is also ensured. The control 100 is also configured for example so that data such as measurement or production data of a cable are stored, assigned to the said cable and kept and stored as digital image.

Although only a few embodiments of the present invention have been shown and described, it is to be understood that many changes and modifications may be made thereunto without departing from the spirit and scope of the invention.

What is claimed is:

1. A machine network for arranging cables according to a specified cable sequence, wherein the cable sequence includes cable types from at least one first cable type group and one second cable type group, wherein the first cable type group, of a first cable type and a second cable type, only includes the first cable type and the second cable type group, of the first cable type and of the second cable type, includes only the second cable type, wherein the machine network includes:

a first cable output device configured for outputting a cable of the first cable type group;

a second cable output device configured for outputting a cable of the second cable type group; and a cable transport device, configured for selectively accepting the cable from the first cable output device and the cable from the second cable output device and for transporting the accepted cables, wherein the selective acceptance at least partially takes place according to the specified cable sequence.

2. The machine network according to claim 1, wherein the cable transport device comprises a plurality of holders arranged one behind the other in a sequence direction, each for receiving at least one part of a cable according to the cable sequence.

3. The machine network according to claim 1, which, further, includes a cable removal device, wherein the cable transport device, further, is configured for selectively transferring a cable from the cable transport device to the cable removal device, wherein the selective transfer takes place at least partially according to the specified cable sequence.

4. The machine network according to claim 3, wherein the cable transport device can be moved to at least one of the first cable output device, the second cable output device and the cable removal device.

5. The machine network according to claim 1, which, further, includes at least one gripper device for selectively accepting and/or selectively transferring the cable.

6. The machine network according to claim 1, wherein at least one of the first cable output device and the second cable output device includes a cable processing machine.

7. The machine network according to claim 1, wherein at least one of the first cable output device, the second cable output device and the cable removal device includes a cable feeding device.

8. The machine network according to claim 7, wherein the cable feeding device is configured for accepting a cable manually fed by an operating person and/or for transferring a cable to an operating person.

9. The machine network according to claim 1, wherein at least one of the first cable output device, the second cable output device and the cable removal device includes a cable store.

10. The machine network according to claim 1, which, further, includes a control which is configured for controlling at least the selective acceptance and/or the selective transfer.

11. The machine network according to claim 10, wherein the control, further, is configured for receiving a desired cable sequence, determining a composition of at least the first cable type group from the first cable output device and the second cable type group from the second cable output device according to the desired cable sequence as the specified cable sequence, and producing an actual sequential arrangement of cables according to the specified cable sequence by controlling at least the first cable output device and the second cable output device.

12. The machine network according to claim 10, wherein the control, further, is configured for storing data which contain at least one from the following group: current position of a cable in the cable transport device, source of a cable in the cable transport device, configuration of the machine network, measurement data of a cable in the cable transport device, production data of a cable in the cable transport device.

13. The machine network according to claim 1, wherein the cable transport device comprises a plurality of holders arranged one behind the other in a transport direction, each for receiving at least one part of a cable according to the cable sequence.

14. A method for arranging cables according to a specified cable sequence, wherein the cable sequence includes cable types from at least one first cable type group and a second cable type group, wherein the first cable type group includes only the first cable type of a first cable type and a second cable type and the second cable type group includes only the second cable type of the first cable type and the second cable type, wherein the method includes:

forming a machine network, which includes the following: a first cable output device, configured for outputting a cable of the first cable type group; a second cable output device, configured for outputting a cable of the second cable type group; and a cable transport device, configured for selectively accepting the cable from the first cable output device and the cable from the second cable output device and for transporting the accepted cable; and automatic controlling of the machine network in such a manner that the selective acceptance takes place at least partially according to the specified cable sequence.

15. The method according to claim 14, wherein the machine network, further, includes a cable removal device, wherein the cable transport device, further, is configured for selectively transferring a cable from the cable transport device to the cable removal device, wherein the method, further, includes:

automatic controlling of the machine network in such a manner that the selective transfer takes place at least partially according to the specified cable sequence.

16. The method according to claim 14, wherein the method further includes:

accepting a desired cable sequence;

determining a composition of at least the first cable type group from the first cable output device and of the second cable type group from the second cable output device according to the desired cable sequence as the specified cable sequence; and producing an actual sequential arrangement of cables according to the specified cable sequence by controlling at least the first cable output device and the second cable output device.

* * * * *